J. P. NIKONOW.
GEAR SHIFTING MECHANISM.
APPLICATION FILED APR. 25, 1914.

1,182,701.

Patented May 9, 1916.
3 SHEETS—SHEET 1.

WITNESSES:
M. A. Schübeler
J. R. Langley.

INVENTOR
John P. Nikonow
BY
Wesley E. Carr
ATTORNEY

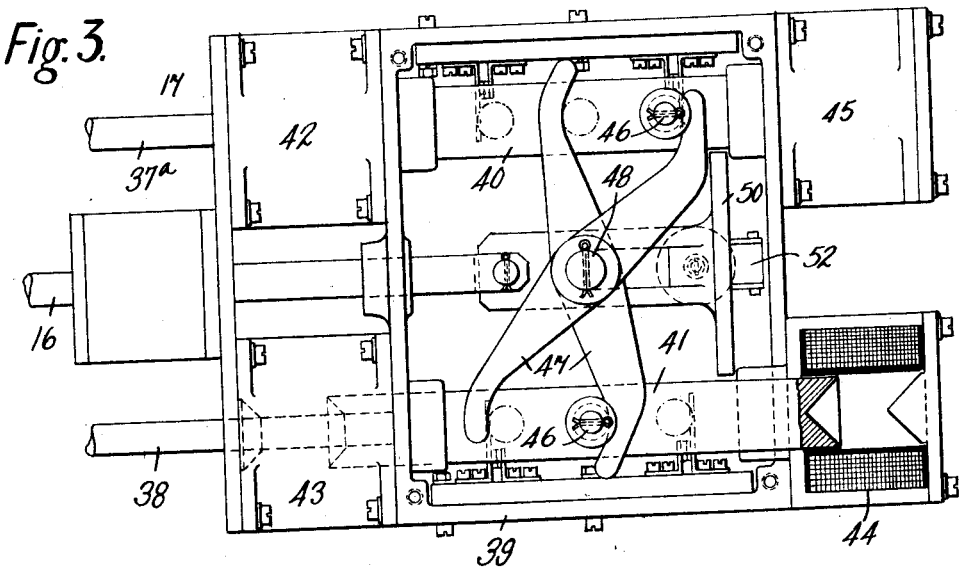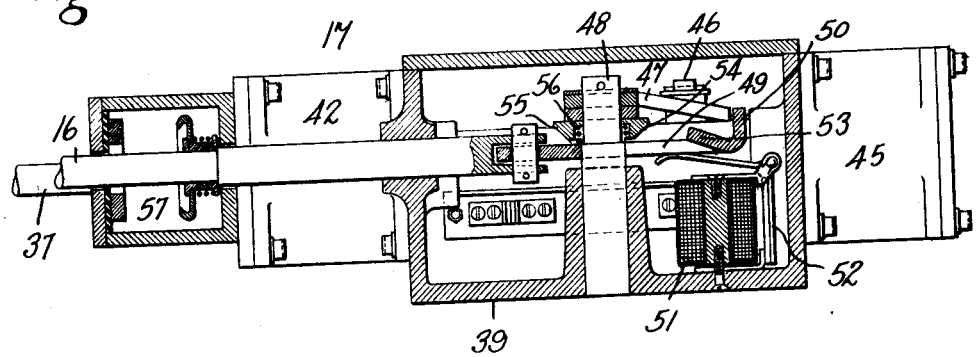

J. P. NIKONOW.
GEAR SHIFTING MECHANISM.
APPLICATION FILED APR. 25, 1914.

1,182,701.

Patented May 9, 1916.
3 SHEETS—SHEET 3.

WITNESSES:
M. A. Schubeler
J. R. Langley

INVENTOR
John P. Nikonow
BY
Wesley J. Carr
ATTORNEY

UNITED STATES PATENT OFFICE.

JOHN P. NIKONOW, OF WILKINSBURG, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,182,701.  Specification of Letters Patent.  Patented May 9, 1916.

Application filed April 25, 1914. Serial No. 834,361.

*To all whom it may concern:*

Be it known that I, JOHN P. NIKONOW, a subject of the Czar of Russia, and a resident of Wilkinsburg, in the county of Allegheny and State of Pennsylvania, have invented a new and useful Improvement in Gear-Shifting Mechanism, of which the following is a specification.

My invention relates to gear-shifting mechanisms and particularly to such mechanisms as are actuated by electromagnets to control the shiftable gear wheels of the transmission mechanisms of automobiles or other motor vehicles.

My invention has for its object to provide a mechanism of the character indicated above that is simple in use and efficient in operation to automatically return the shifted gear wheels to a neutral position before they can be adjusted for a different speed ratio.

In the operation of gear-shifting mechanisms, as heretofore constructed, it has been necessary, ordinarily, to employ separate operations in order to return the shifted gear wheel to its neutral position and to adjust the transmission mechanism for another speed ratio. This method of operation necessitates that an appreciable interval shall elapse between the separate operations. It is highly desirable that these operations succeed each other immediately, in order that the change of speed ratios may be accomplished by a continuous operation.

I provide a mechanism in which the defect above specified is avoided. The actuating mechanism automatically returns the shifted gear wheel to its neutral position before the gear wheel to be shifted to produce a second speed ratio is actuated from its neutral position, the two operations being accomplished by a continuous movement of the actuating means.

Figure 1:
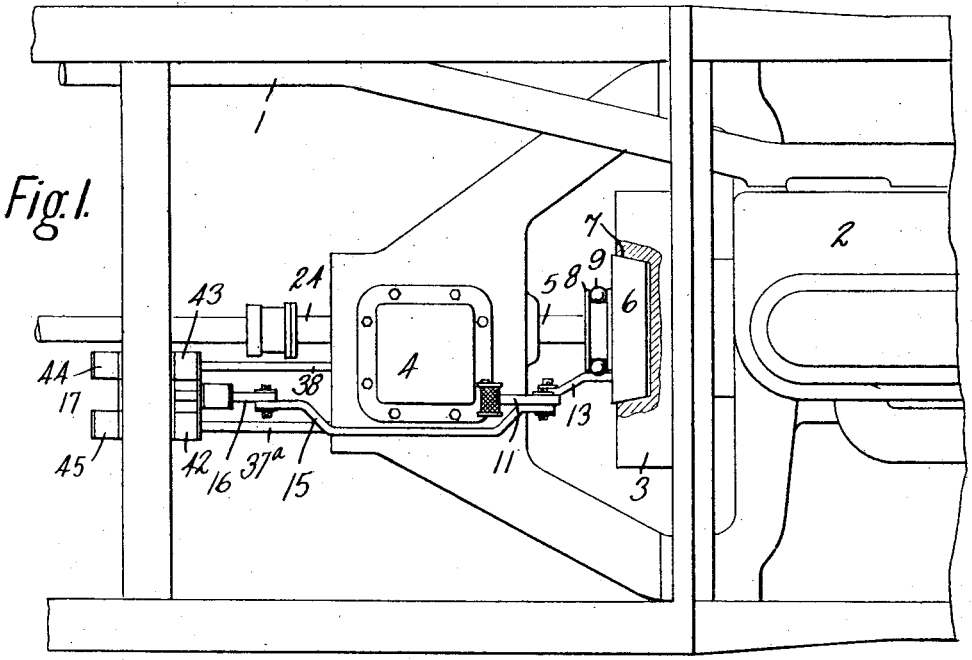
Figure 2:
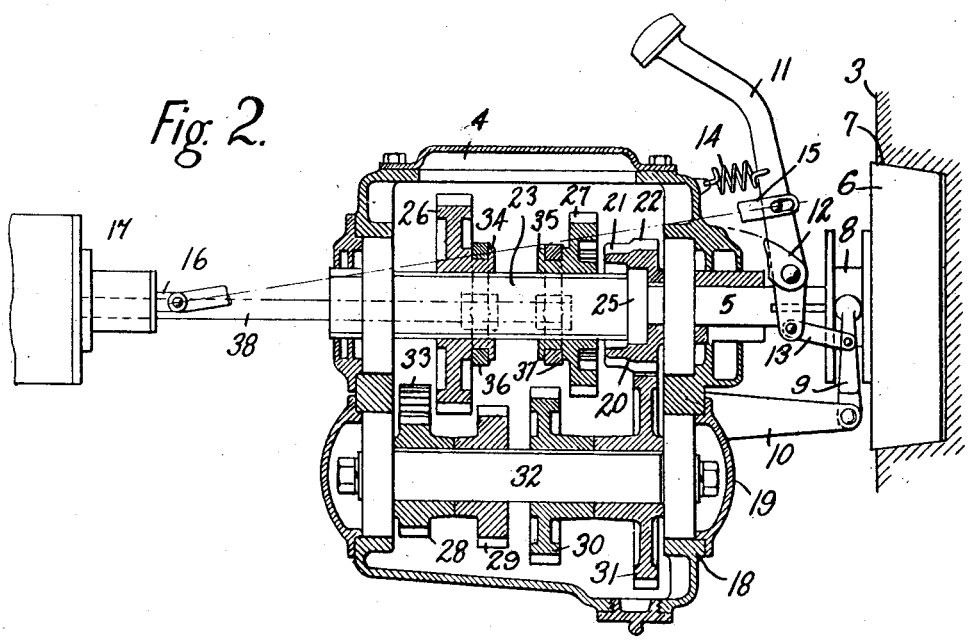
Figure 5:
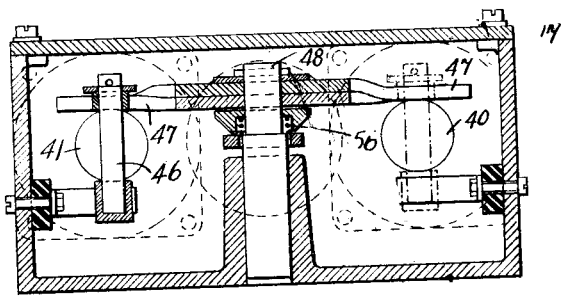
Figure 6:
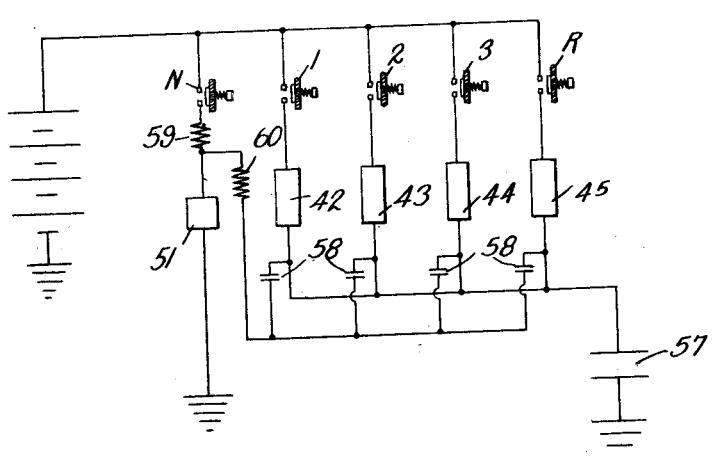

In the accompanying drawings, Figure 1 is a view, partially in plan and partially in section, of a portion of an automobile with my invention attached thereto. Fig. 2 is a view, partially in elevation and partially in section, of the transmission mechanism of an automobile and its related parts. Fig. 3 is a view, partially in plan and partially in section, of the gear-shifting mechanism. Fig. 4 is a view, in longitudinal section, of the mechanism of Fig. 5. Fig. 5 is a view, in transverse section, of the mechanism of Fig. 3. Fig. 6 is a diagrammatic view of the electrical circuits employed in connection with my invention.

Referring particularly to Figs. 1 and 2, an automobile chassis 1, only a portion of which is shown, is provided with a gas engine 2 having a fly wheel 3. A transmission mechanism or change-speed gear mechanism 4 is connected to the engine 2 by a shaft 5 and a conical clutch member 6 that is slidably mounted on the shaft 5 to coact with a correspondingly shaped clutch member 7 formed in the fly wheel 3. The clutch member 6 is provided with an integral grooved collar 8 to be engaged by a yoke member 9 that has a pivotal support upon a bracket 10. A pedal lever 11, that is adapted to be operated by the foot of the operator, has a pivotal support upon a lug 12 and is connected by a link 13 to the yoke member 9. A spring 14, that is attached at one end to a suitable stationary part, normally retains the clutch pedal lever 11 in its rearward position, with the clutch member 6 engaging the clutch member 7 in the fly wheel 3. The lever 11 has a lost motion connection to a link 15 which connects it to a rod 16 of a gear shifting mechanism indicated at 17.

The transmission mechanism 4 forms no part of my invention but is so combined therewith that a description thereof is desirable in order to explain the operation of the gear-shifting mechanism. The shaft 5, which is connected to the clutch member 6, extends into the transmission casing 18 through an end wall 19 and has a bearing therein. A gear wheel 20, having two sets of gear teeth 21 and 22, is mounted upon the shaft 5 within the casing 18. A transmission shaft 23, which is connected to the main transmission shaft 24, is in axial alinement with the shaft 5 and has a bearing at 25 within the gear wheel 20. The shaft 23 is adapted to be connected to the shaft 5 at different speed ratios by means of two gear wheels 26 and 27 that are slidably keyed upon the shaft 23, gear wheels 28, 29, 30 and 31 that are fixed upon a counter shaft 32 and an idler gear wheel 33 that is in mesh with the gear wheel 28.

The gear wheel 31 is always in mesh with the gear wheel 20 to connect the shafts 5 and 32. The mechanism is arranged to provide three speeds in the forward and one in the reverse direction. The changes in speed ratio are controlled by the slidable gear wheels 26 and 27 which are respectively provided with integral grooved collars 34 and 35 to be engaged by yoke members 36 and 37. The yoke members 35 and 36 are respectively fixed upon shift rods 37ᵃ and 38 that are controlled by the gear shifting mechanism, as will be later described.

When the gear wheel 26 is in mesh with the gear wheel 29, the mechanism is in its first or low-speed position and the shaft 5 is connected through the gear teeth 22, gear wheel 31, counter shaft 32 and gear wheels 29 and 26 to the transmission shaft 23. For the second or intermediate speed, the gear wheel 27 is shifted into mesh with the gear wheel 30. For the third or high speed, the gear wheel 27 is shifted to the right until internal gear teeth 38, with which the gear wheel 27 is provided, mesh with the gear teeth 21. The shaft 5 is then directly connected to the transmission shaft 23 and the latter is driven at engine speed. For driving in the reverse direction, the gear wheel 26 is shifted into mesh with the idler gear wheel 33, which is always in mesh with the gear wheel 28. The transmission mechanism is illustrated in its neutral or inoperative position in which the shaft 23 is not connected to the counter shaft 32.

Referring now to Figs. 3, 4 and 5, the gear shifting mechanism comprises a housing or casing 39 of substantially rectangular shape. Two shift rods 40 and 41 are slidably mounted in the end walls of the casing and project therethrough to form the movable core members of electromagnets 42, 43, 44 and 45. In the normal position of the shift rods, as illustrated by that of the rod 41, Fig. 3, the ends of the rods are withdrawn from the corresponding magnets. The shift rods are thus adapted to be shifted from the neutral position, in either direction, according to the energization of the several electromagnets. Each of the rods 40 and 41 is provided, at substantially its midportion, with a pin 46 that extends therethrough and is adapted, when the rod is shifted in either direction, to engage one of a pair of levers 47 that are pivotally mounted on a stationary pin 48. The rods 40 and 41 and the gear wheels 26 and 27, that are respectively connected thereto, are returned to their neutral positions by a mechanism comprising the pedal lever 11, the rod 16, and a member 49 that is provided with an upturned portion 50 for engaging the levers 47. The member 49 is slotted to receive the pin 48 which serves as a guide for it, as it is reciprocated by the rod 16. The member 49 is controlled, as to its relative vertical position, by an auxiliary electromagnet 51 and a lever 52, one end of which serves as an armature for the electromagnet 51 and the other end of which presses upwardly against the member 49 when the electromagnet 51 is energized. The member 49 is actuated downwardly when a bent portion 53 engages an inclined surface 54 of a collar member 55 that is mounted upon the pin 48. A spring 56 normally retains the member 49 in its lower position out of the paths of movement of the levers 47.

A switch 57, which controls the connection of a battery to the several main electromagnets, is controlled by the rod 16 which has a lost motion connection to the lever 11 in order to permit the manipulation of the engine clutch without actuating the gear shifting mechanism. The electrical connection of the electromagnet 51 to the battery is controlled by four self-closing limit switches 58, one of which is in circuit with the electromagnet, when it is energized. The switch 58, that is in circuit, is opened by the corresponding pin 46 when the shift rod 40 or 41, as the case may be, has reached the end of its path of movement to mesh one pair of coacting gear wheels.

The electrical circuits that are employed to control the gear-shifting mechanism are illustrated in Fig. 6. Five circuits are connected in parallel relation to a storage battery and are controlled by a set of push buttons that may be located upon the steering wheel or other suitable place. Four of the parallel circuits respectively comprise the main electromagnets 42, 43, 44 and 45 and push buttons that are designated according to the speed ratio controlled by them as 1, 2, 3 and R (reverse). The switch 57, which is controlled by the lever 11, is in series with the several main electromagnets. The remaining circuit comprises the auxiliary magnet 51, a resistor 59 and a push button designated by N (neutral). Each of the four circuits first described is connected, through a limit switch 58 and a resistor 60, to the electromagnet 51. By means of this arrangement, the electromagnet 51 will be energized upon the closing of either of the several push buttons. The circuit through the resistor 60 is of sufficiently high resistance to limit the energization of the main magnets while permitting the flow of current of a value sufficient to fully energize the magnet 51. A low-resistance circuit will be established for that main magnet, the circuit of which has been partially completed by one of the push buttons, when the switch 57 has been closed by the actuation of the pedal lever 11 to the limit of its path of movement.

It may be assumed that the transmission gear mechanism is in its neutral position, as illustrated in Fig. 2, and that the gear-shifting mechanism is in its corresponding normal or neutral position. It may be assumed, also, that the engine has been started and that the engine clutch members 6 and 7 are disengaged. It is desirable to start the vehicle on first speed, and the push button designated by 1 is accordingly pressed to complete a circuit from the battery through the push button 1, electromagnet 42, limit switch 58, registor 60 and magnet 51 to ground. The clutch pedal 11, which, at the time of starting the engine, is in such a position that the engine clutch members 6 and 7 are out of engagement, is then pressed forwardly beyond the clutch-disengaging position to close the switch 57.

The closing of the switch 57 completes a low-resistance circuit for the electromagnet 42 and it is thereupon energized to draw the shift rod 40 to the left (Fig. 3). The gear wheel 26, which is connected to the shift rod 40, is thereby shifted into mesh with the gear wheel 29. When the gear wheels 26 and 29 are fully meshed, the pin 46, which then occupies the position indicated by dot and dash lines, will have opened the corresponding limit switch 58 to break the circuit of the electromagnet 51. The operator then allows the spring 14 to retract the clutch pedal 11 and thereby open the switch 57 to break the circuit of the electromagnet 42. The rod 16 and the member 49 are returned to their respective normal positions. The engine clutch is still out when the various parts of the gear shifting mechanism are in their respective normal or neutral positions. Further return movement of the clutch pedal will effect the engagement of the engine clutch, and the vehicle will be driven through the connections above described.

When it is desired to change the speed ratio, as for example, to second speed, the push button designated by 2 may be pressed at any time desired in advance of the actual change. The magnet 51 will be energized in the manner above described, in connection with the push button 1, to attract the armature 52 and thereby raise the member 49 upwardly to occupy the position shown in Fig. 4. To effect the change to the desired speed, the operator presses the pedal lever 11 to disengage the engine clutch. The rod 40 is in its shifted position, with the pin 46 in engagement with the corresponding lever 47, and the hook portion 50 of the member 49 is in the position to engage the said lever 47, upon a slight movement of the member 49. A further actuation of the lever 11, after the clutch is out, operates to shift the rod 40 to its neutral position by means of the member 49 and the lever 47. When this position is reached, the portion 53 engages the inclined portion 54 of the member 55, and the member 49 is actuated downwardly out of engagement with the lever 47. The further movement of the lever 11 and the rod 16 closes the switch 57 and thus completes a low-resistance circuit for the electromagnet 43, which is thereupon energized to shift the rod 41 to the left (Fig. 3). At the end of this movement, the gear wheel 27 is in mesh with the gear wheel 30, and the pin 46 has opened the corresponding limit switch 58 to open the circuit of the electromagnet 51. The return movement of the lever 11 by the spring 14 effects engagement of the engine clutch, and the vehicle will be driven at second speed. In the same manner, changes may be made to third speed, or the direction of drive reversed, by actuating the appropriate push buttons. It will, of course, be understood that, in order to reverse the direction of the vehicle, it is necessary to bring it to a stop before the clutch is thrown in.

When it is desired to return either of the shiftable gear wheels 26 and 27 to the neutral position, the neutral button N is closed to energize the electromagnet 51. The clutch is disengaged as before, whereupon the rod 16 and the member 49 are actuated to the left (Fig. 3). The member 49 is in a position to immediately engage the lever 47 that has been shifted from its neutral position. The shifted rod 40 or 41, as the case may be, will then be returned to its neutral position, in the manner above described, and the member 49 will be disengaged from the lever 47. It will then be impossible to shift the gear wheel until one of the buttons, other than the neutral button N, is operated to partially complete the corresponding circuit, and the clutch pedal has been actuated to the limit of its path of movement to close the switch 57.

It will be noted that I provide a mechanism by means of which the shifted gear wheels may be returned to a neutral position and the transmission mechanism adjusted for a different speed ratio by a continuous movement of a single actuating member. The gear-shifting mechanism and the clutch pedal are so related that it is impossible to close the circuit of either of the actuating magnets until a push button has been depressed and the engine clutch is disengaged.

I claim as my invention:

1. In a gear-shifting mechanism, the combination with a shiftable member, and a manually operable lever, of a set of push buttons, means for shifting said member upon the actuation of one of said buttons and said lever and for connecting the shifted member to said lever upon the actuation of either of said buttons.

2. In a gear-shifting mechanism, the combination with a member shiftable in either direction from a neutral position, a lever operatively associated with said member, a clutch lever, means for connecting said levers to return said member to its neutral position, means for shifting said member, and means actuated by said clutch lever for controlling the shifting of said member from its neutral position.

3. In a gear-shifting mechanism, the combination with a shiftable member, of means comprising a plurality of electromagnets for shifting said member in opposite directions from a neutral position, a clutch lever, means comprising an electromagnet for controlling the connection of said lever to said member, and push buttons for controlling the circuits of said electromagnets.

4. In a gear-shifting mechanism, the combination with a shiftable member, of means comprising a plurality of electromagnets for shifting said member in opposite directions from a neutral position, a clutch lever, an electromagnet for controlling the connection of said lever to said member, means coöperating with one of said shifting electromagnets and said controlling electromagnet to complete a high-resistance circuit, and means actuated by said lever for completing a low-resistance circuit for said shifting electromagnet.

5. In a gear-shifting mechanism, the combination with a member shiftable in opposite directions from a neutral position, a set of push buttons, a clutch lever and a switch carried by said lever, of a plurality of electromagnets for shifting said member, said electromagnets being controlled by said buttons and said switch, and an electromagnet controlled by either of said push buttons for controlling the mechanical connection of said lever to said member.

6. In a gear-shifting mechanism, the combination with a member shiftable in opposite directions from a neutral position, and a plurality of electromagnets for shifting said member, of a clutch lever, an electromagnet for controlling the connection of said lever to said member, means coöperating with one of said shifting electromagnets and said controlling electromagnet to complete an electrical circuit, and means actuated by said lever for completing a circuit in parallel relation to said controlling electromagnet.

7. In a gear-shifting mechanism, the combination with a shiftable member, of means for shifting said member from a normal position, a clutch lever, and electrically controlled means for connecting said member to said lever to return said member to its normal position.

8. In a gear-shifting mechanism, the combination with a shiftable member, of electrical means for shifting said member from a normal position, means for returning said member to its normal position, comprising an electrical controlling device in circuit with said electrical means.

9. In a gear-shifting mechanism, the combination with a shiftable member, and an electrical device for controlling the position of said member, of an electrical device for controlling the return of said member to its normal position, common means for controlling the circuits of said devices, and means for completing a circuit for one of said devices.

In testimony whereof, I have hereunto subscribed my name this 18th day of Apr. 1914.

JOHN P. NIKONOW.

Witnesses:
 GEO. B. GIRARD,
 B. B. HINES.